US011063719B2

(12) United States Patent
Wang

(10) Patent No.: US 11,063,719 B2
(45) Date of Patent: Jul. 13, 2021

(54) ENCODING MULTISTAGE MESSAGES IN A 5G OR OTHER NEXT GENERATION WIRELESS NETWORK

(71) Applicant: AT&T Intellectual Property I, L.P., Atlanta, GA (US)

(72) Inventor: Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/536,714

(22) Filed: Aug. 9, 2019

(65) Prior Publication Data

US 2021/0044399 A1 Feb. 11, 2021

(51) Int. Cl.
*H04L 5/00* (2006.01)
*H04W 92/18* (2009.01)

(52) U.S. Cl.
CPC .......... *H04L 5/0048* (2013.01); *H04W 92/18* (2013.01)

(58) Field of Classification Search
None
See application file for complete search history.

(56) References Cited

U.S. PATENT DOCUMENTS

2020/0260231 A1* 8/2020 Ganesan ............... H04B 7/0695
2020/0275474 A1* 8/2020 Chen ..................... H04L 5/0055

* cited by examiner

Primary Examiner — Kouroush Mohebbi
(74) Attorney, Agent, or Firm — Amin, Turocy & Watson, LLP

(57) ABSTRACT

The technologies described herein are generally directed toward link adaption for multistage messages. According to an embodiment, a system can comprise a processor and a memory that can enable operations facilitating performance of operations including determining that a control signal that was transmitted by the first device was not received by a second device, wherein the control signal comprises a first portion employing a first transmission scheme and a second portion employing a second transmission scheme. The operations can further include based on the determining that the control signal was not received by the second device, selecting a third transmission scheme for the second portion of the control signal. Further, the operations can include, based on a mapping of the third transmission scheme to a fourth transmission scheme in a mapping reference, selecting the fourth transmission scheme for the first portion of the control signal, and transmitting the control signal.

20 Claims, 10 Drawing Sheets

ENCODING MULTISTAGE MESSAGES IN A 5G OR OTHER NEXT GENERATION WIRELESS NETWORK

TECHNICAL FIELD

The subject application is related to wireless communication systems, and, for example, encoding messages and/or resource utilization in a fifth generation (5G) or other next generation wireless network.

BACKGROUND

As new approaches are developed to link devices in wireless networks, the importance of efficient and effective signaling between devices increases. One type of signal that is particularly important for new peer-to-peer approaches is the control signal transmitted from one device to another. In an effort to improve the handling of some control messages, a multistage system has been developed whereby different parts of a control signal can be transmitted using different transmission schemes, with different decoding processes being performed by receiving devices.

Traditionally, feedback from a receiving device has been used to improve the transmission of signals, but conventional feedback systems can be rendered ineffective by improvements in signaling approaches.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
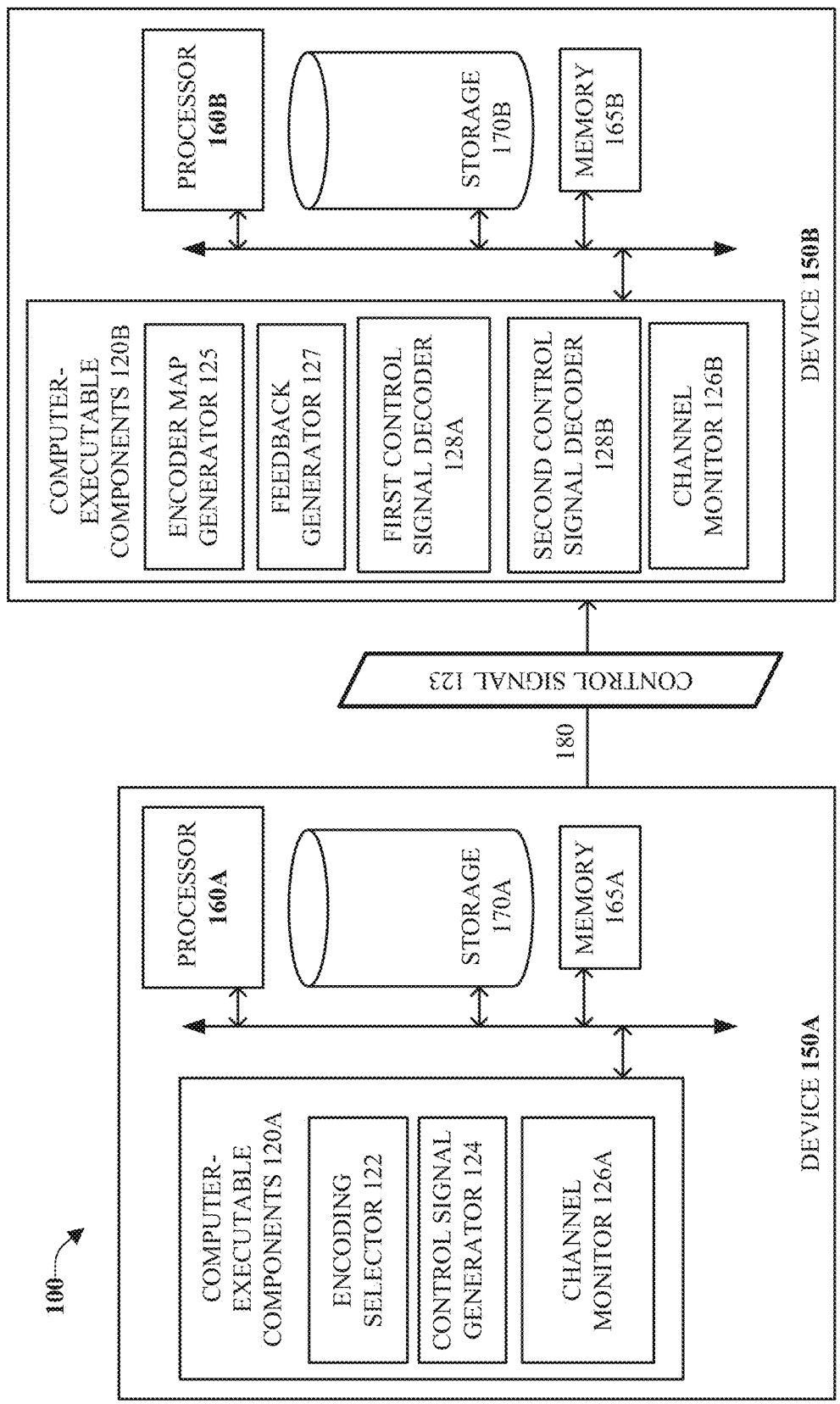
FIG. 1 is an architecture diagram of an example system that can facilitate link adaption for multistage messages, in accordance with one or more embodiments.

Generally speaking, in one or more embodiments, can provide improved link adaption for multistage messages. In addition, one or more embodiments described herein can be directed towards a multi-connectivity framework that supports the operation of New Radio (NR, sometimes referred to as fifth generation (5G)) As will be understood, one or more embodiments can allow an integration of user equipments (UEs) with network assistance, by supporting control and mobility functionality on cellular links (e.g. LTE or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" are used herein. These terms may be used interchangeably, and refer to any type of network node that can serve user equipment and/or be connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

As noted above, some embodiments are described in particular for 5G new radio systems. The embodiments are however applicable to any radio access technology (RAT) or multi-RAT system where the user equipment operates using control signals, e.g. LTE FDD/TDD, WCMDA/HSPA, GSM/GERAN, Wi Fi, WLAN, WiMax, CDMA2000, etc.

In some embodiments the non-limiting term user equipment (UE) is used. This term can refer to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc. Example UEs are described further with FIGS. 2, 9 and 10 below.

FIG. 1 is an architecture diagram of an example system 100 that can facilitate link adaption for multistage messages, in accordance with one or more embodiments. For purposes of brevity, description of some elements and/or processes of embodiments discussed further below are omitted in this discussion of FIG. 1.

System 100 can include devices 150A-B, with device 150A transmitting 180 control signal 123 to device 150B. In an example discussed throughout this disclosure, control signal 123 can have a two stage control payload, and a data payload, and each part can be received and processed by different elements of device. One example reason for this is that it can facilitate different, improved approaches to be used by UEs (e.g., device 150B, in this example) to receive and utilize control information, e.g., different encoding schemes can be used for the different parts, with some schemes being less susceptible to interference but carrying less control data, and other schemes being more susceptible to interference and requiring upgraded UE capabilities, but also carrying more control data. More details about control signal 123, as well as descriptions of how one or more embodiments can process the different parts, are included with descriptions of FIGS. 2-6 below.

It is also important to note that, although one or more embodiments describe control signals 123 that are SCI messages (e.g., from UE to UE in a NR approach), the same approaches to processing multistage messages can be applied to other contexts, e.g., with device 150A being a base station and device 150B being a UE, or with another type of multistage message. Different types of devices 150A-B are discussed with FIG. 2 below. Similarly, when one or more examples discussed herein specify particular channel being used for transmission of different messages (e.g., example feedback communicated by the Physical Uplink Control CHannel (PUCCH)), these are non-limiting example, and one having skill in the relevant arts, given the description herein, will appreciate that other channels can be used by one or more embodiments.

In some embodiments, memories 165A-B can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1004 of FIG. 10 discussed below. Such examples of memories 165A-B can be employed to implement any embodiments of the subject disclosure.

According to multiple embodiments, processors 160A-B can comprise one or more processors and/or electronic circuitry that can implement one or more computer and/or machine readable, writable, and/or executable components and/or instructions that can be stored on memories 165A-B. For example, processors 160A-B can perform various operations that can be specified by such computer and/or machine readable, writable, and/or executable components and/or instructions including, but not limited to, logic, control, input/output (I/O), arithmetic, and/or the like. In some embodiments, processors 160A-B can comprise one or more central processing unit, multi-core processor, microprocessor, dual microprocessors, microcontroller, System on a Chip (SOC), array processor, vector processor, and/or another type of processor. Further examples of processors 160A-B are described below with reference to processor 902 of FIG. 9 below, and processing unit 1004 of FIG. 10 discussed below. Such examples of processors 160A-B can be employed to implement any embodiments of the subject disclosure.

According to multiple embodiments, devices 150A-B can include respective memories 165A-B that can store one or more computer and/or machine readable, writable, and/or executable components and/or instructions 120A-B that, when respectively executed by processors 160A-B, can facilitate performance of operations defined by the executable component(s) and/or instruction(s). For example, memories 165A-B and storage 170A-B can store computer and/or machine readable, writable, and/or executable components 120A-B and/or instructions that, when executed by processors 160A-B, can facilitate execution of the various functions described herein relating to devices 150A-B. As depicted, device 150A includes computer-executable components 120A that can comprise encoding selector 122, control signal generator 124, and channel monitor 126A, and device 150B includes computer-executable components 120B that can comprise encoder map generator 125, feedback generator 127, first control signal decoders 128A-B, and channel monitor 126B. Each of these components are described in detail, with one or more embodiments described below.

Generally, applications (e.g., computer-executable components 120A-B) can include routines, programs, components, data structures, etc., that perform particular tasks or implement particular abstract data types. Moreover, those skilled in the art will appreciate that the methods described herein can be practiced with other system configurations, including single-processor or multiprocessor systems, mini-computers, mainframe computers, as well as personal computers, hand-held computing devices, microprocessor-based or programmable consumer electronics, and the like, each of which can be operatively coupled to one or more associated devices It should be appreciated that the embodiments of the subject disclosure depicted in various figures disclosed herein are for illustration only, and as such, the architecture of such embodiments are not limited to the systems, devices, and/or components depicted therein. For example, in some embodiments, devices 150A-B can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

Figure 2:
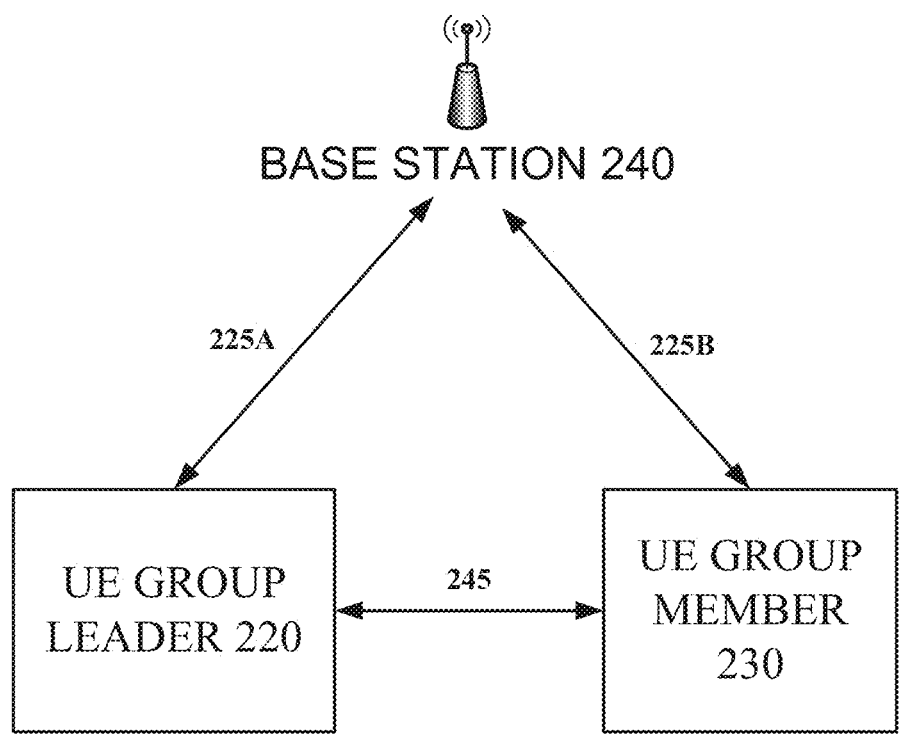
FIG. 2 is a diagram of example contexts in which one or more embodiments can process control signals, in accordance with one or more embodiments.

FIG. 2 is a diagram 200 of example contexts in which one or more embodiments can process control signals, in accordance with one or more embodiments. For purposes of brevity, description of like elements and/or processes employed in other embodiments is omitted.

It should be noted that, in accordance with one or more embodiments, base station 240, UE group leader 220 and UE group member 230 can be operating in a wireless communication system, including one or more communication service provider networks that facilitate providing wireless communication services to various devices. and/or various additional network devices (as is understood) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large-scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

In this example, a multi-connectivity framework can support the operation of New Radio (NR, sometimes referred to as 5G) vehicle-to-everything (V2X) services. As will be understood, the technology can facilitate seamless integration of V2X user equipments (UE group leader 220 is a leader of a group of UEs in which UE group member is a member) with network assistance (e.g., base station 240 using connections 225A-B) by supporting control and mobility functionality on cellular links (e.g. LTE or NR), which provide benefits that can include robustness, reduced overhead, and global resource management, while facilitating direct communication links via NR sidelink.

Wireless radio technology provides the ability promote a UE (which can be a special type of UE such as a Vehicle or Road-side Unit) to act as group leader for a group of neighboring UEs that can exchange information by employing sidelink connections. For one or more embodiments described herein, UE group leader 220 can generate and transmit 245 a control signal to UE group member 230 to establish a connection for scheduling and other administrative functions.

An example of this type of control signal message is a Sidelink Control Information (SCI) message. In more detailed examples discussed herein, a type of SCI signal can be used with one or more embodiments, e.g., a Physical Sidelink Control Channel (PSCCH) message, this message having at least two control signal portions (also termed stages). The structure of this signal, and how one or more embodiments can be applied to this signal, e.g., by link adaption approaches, is discussed with FIG. 3 below.

It is important to note that, approaches described herein can be applied to other, similarly structures messages. For example, a payload size for the first stage in the two-stage SCI described above is the same for unicast, groupcast, and broadcast control signals for a resource pool. For example, control messages from base station 240 to UE group leader 220 and UE group member 230 can be communicated to these devices, these control message having a two-stage structure that can, with the disclosure herein, facilitate processing of these signals by one or more embodiments.

Figure 3:
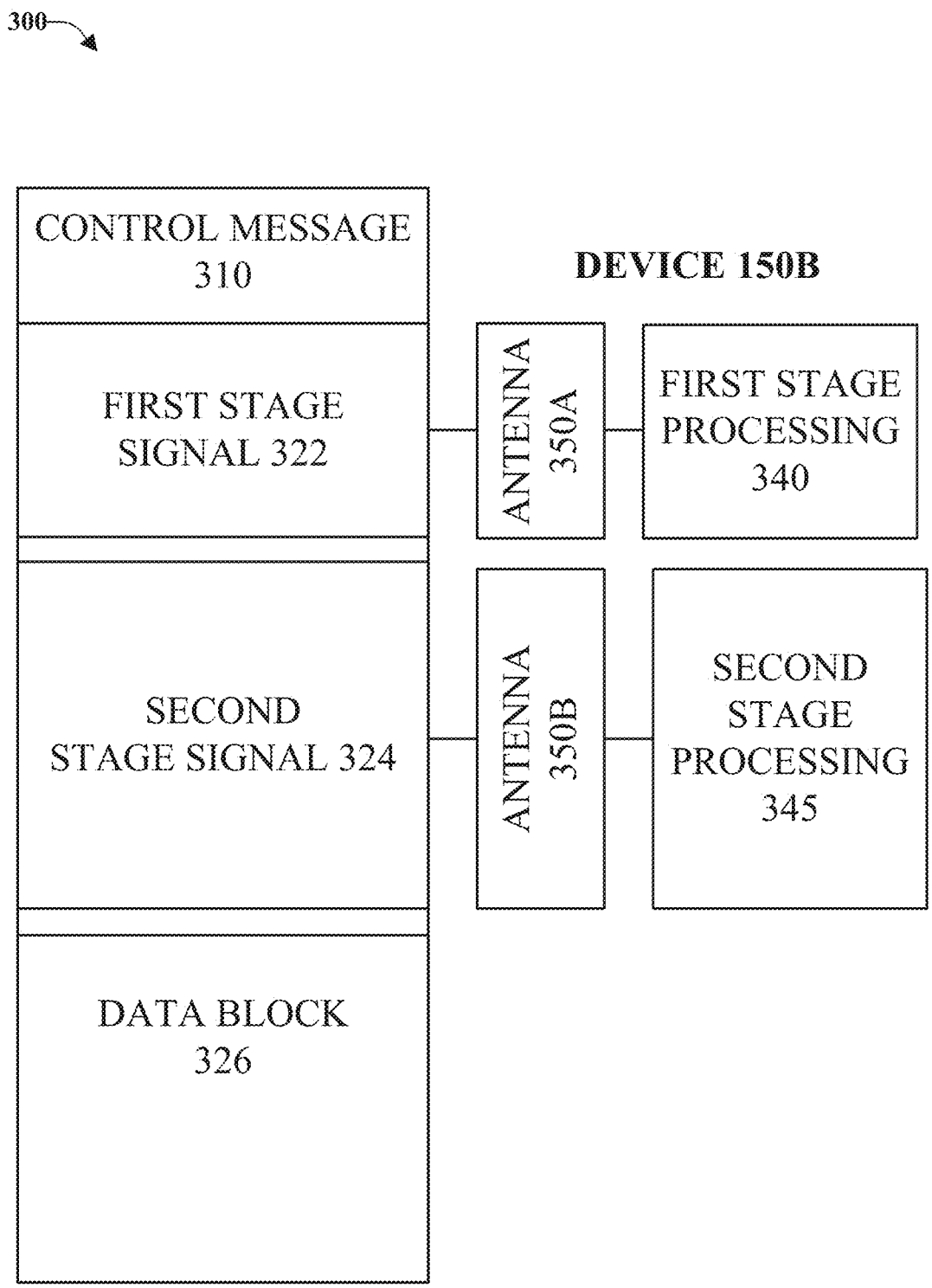
FIG. 3 depicts an example two-stage control message upon which one or more embodiments can perform different types of link adaption, in accordance with one or more embodiments.

FIG. 3 depicts an example two-stage control message 300 upon which one or more embodiments can perform different types of link adaption, in accordance with one or more embodiments. For purposes of brevity, description of like elements and/or processes employed in other embodiments is omitted.

Control message 310 comprises first stage signal 322, second stage signal 324, and data block 326. As would be appreciated by one having skill in the relevant arts, given the description herein, information related to channel sensing can carried on first stage, which can be smaller and encoded using a different encoding scheme than second stage signal 324.

Antennas 350A-B are depicted to illustrate that different SCI stages (e.g., 322 and 324) can require being be transmitted using approaches that can require a UE with different antennas. Further, first stage processing 340 and second stage processing 345 emphasizes that, for a successful decoding, a variety of processes need to be performed, e.g., analog to digital conversion of the analog antenna signal, identifying the encoding scheme used, and other similar processes.

It should be noted that, in this example (as with PSCCH signals), the receiving device can receive first stage signal 322 without an indication as to what encoding scheme was selected by encoding selector 122 to encode first stage signal 322. In some circumstances, UE can detect the encoding scheme from the structure of the message, this approach being also termed "blind decoding." To avoid this extra process, first stage signal 322 can include an indicator as to which encoding scheme was used to encode the second stage. For example, the second stage can be decoded by using Physical Sidelink Shared Channel (PSSCH) demodulation reference signals (DMRS).

It should further be noted that, although one or more embodiments described herein, use the term "decoded," to summarize the process from receiving the analog signal from the antenna, to having a decoded signal for use, one having skill in the relevant arts, given the description herein, appreciates that a variety of processes can be performed by a UE to have a successfully decoded signal, including but not limited to, analog to digital conversion, identifying the encoding scheme used, and other similar processes. Because of this, FIG. 3 includes decoding in a block termed first stage processing 340.

In one or more embodiments, first stage signal 322 SCI design can include, but is not limited to, a resource reservation information which allocate resource for a period in future, the format of second stage signal 324 SCI, the MCS of second stage signal 324 SCI, and periodicity of second stage signal 324. Further, second stage SCI can include, but is not limited to, the MCS of data block 326 (also termed data packet), and hybrid automatic repeat request (HARQ) information, including HARQ process number and new data indictor (NDI).

Figure 4:
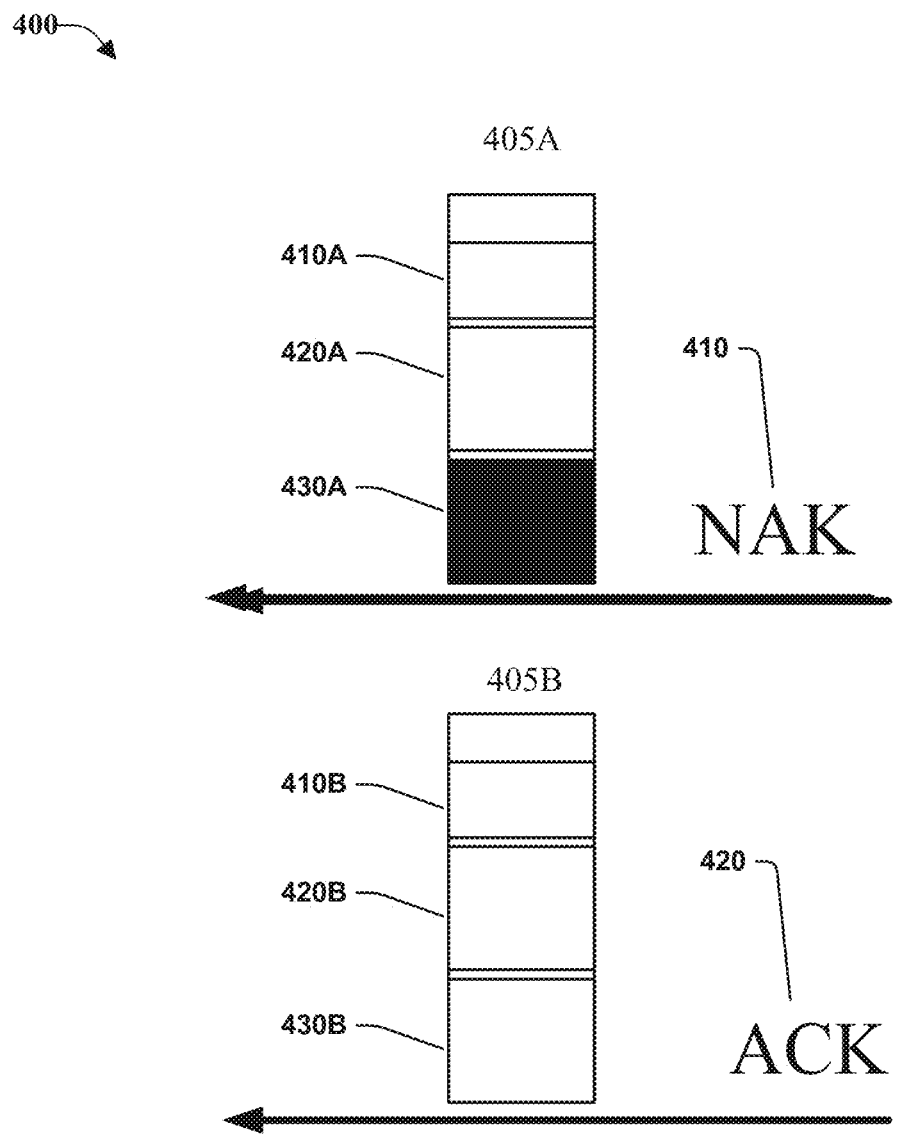
FIGS. 4-5 depict example control messages, with a breakdown of which stages were successfully decoded, along with the feedback provided for link adaption by a transmitting device, in accordance with one or more embodiments.
Figure 5:
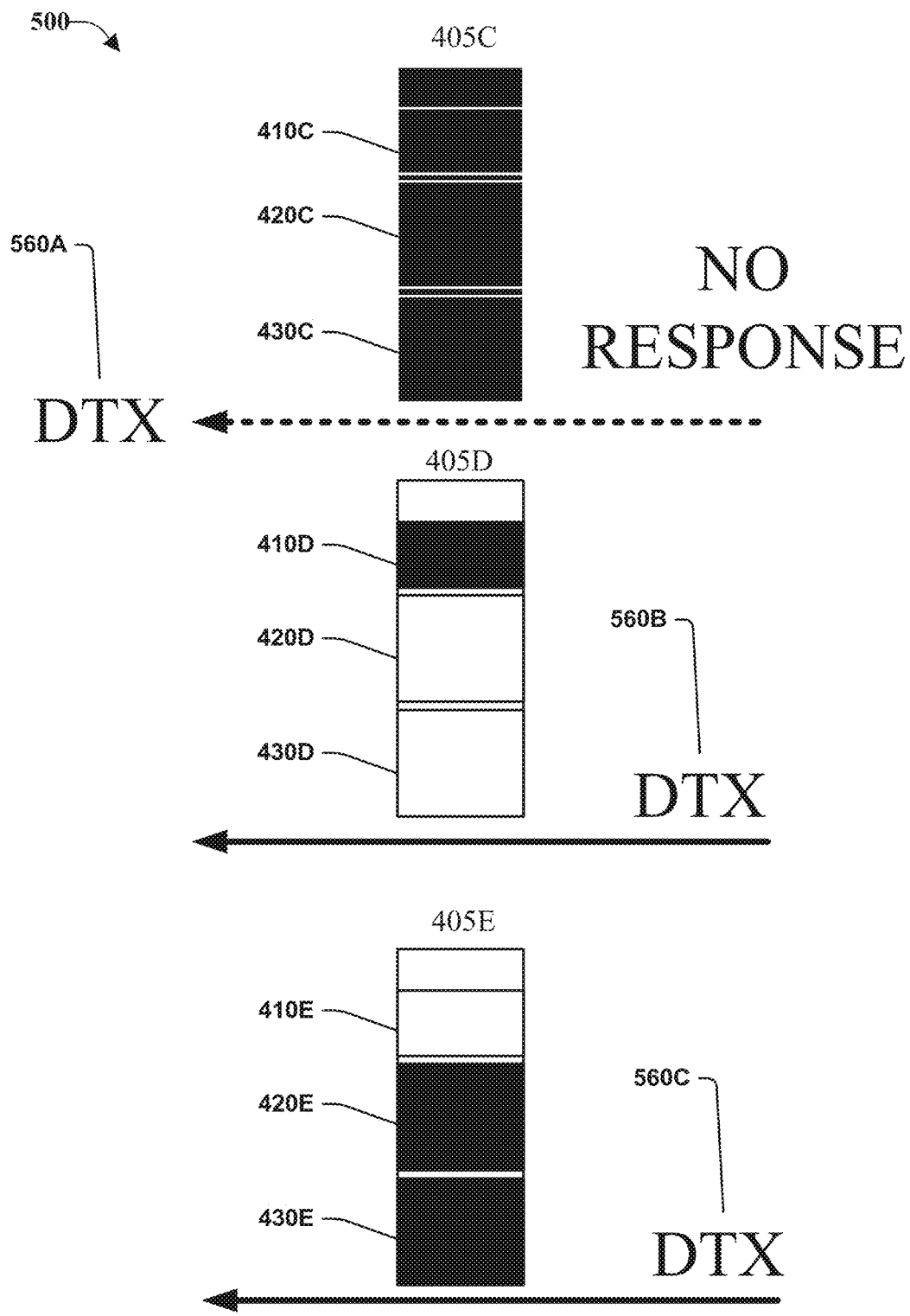

FIGS. 4-5 depict example control messages 400-500, with a breakdown of which stages were successfully decoded, along with the feedback provided for link adaption by a transmitting device, in accordance with one or more embodiments. For purposes of brevity, description of like elements and/or processes employed in other embodiments is omitted.

In an example that highlights features of one or more embodiments, control message 310 can be transmitted by UE group leader 220 to UE group member 230. One having skill in the relevant arts, given the description herein, will appreciate that encoding schemes can be selected for transmission of different stages. In this example, encoding selector 122 of UE group leader 220 selects encoding schemes for (also termed modulation and coding schemes (MCS)) for both first stage signal 322 and second stage signal 324 that have a higher encoding rate that other schemes, but also are more susceptible to interference.

After receipt of the control message, UE group member 230 can provide feedback (e.g., by feedback generator 127) about the transmission, as depicted in FIGS. 4-5 and described below. One of the actions that can be taken based on the feedback is an altering of the encoding schemes used to encode first stage signal 322 and second stage signal 324. As noted above, as transmitted, both first stage signal 322 and second stage signal 324 that have a higher encoding rate that other schemes, but also are more susceptible to interference. If the feedback received from UE group member 230 is negative (e.g., the control message could not be decoded because of interference) then encoding selector 122 can, for a retransmission of the control signal, select encoding schemes that are less susceptible to interference.

This feedback loop can be problematic because conventionally there is no special feedback design for two-stage control signals. Current feedback channel is based three states design: acknowledgement (ACK), not-acknowledged (NAK), and discontinuous transmission (DTX). Typically, ACK and NAK are transmitted (e.g., by UE group member 230) as a sequence by the PUCCH or Media Access Control layer Control Element (MAC CE) channels.

Circumstances that can cause a NAK 410 response are depicted in FIG. 4. After the transmission and attempted decoding of control message 405A, first stage signal 410A and second stage signal 420B were successfully decoded (e.g., shown in white in FIG. 4), but data block 430A (depicted in black) was not successfully decoded. This circumstance can cause a NAK 410 to be provided as feedback. Conversely, control message 405B has all three parts decoded, and this can cause the ACK 420 feedback to be generated. In one or more embodiments, based on these indications that the two stages of the control signals were successfully decoded, encoding selector can be influenced to reuse the previously selected encoding schemes in similar circumstances.

FIG. 5 depicts, in contrast to the NAK 410 and ACK 420 circumstance of FIG. 4, three situations where the transmitting device (e.g., UE group leader 220) receives or determines a DTX 560A-C, in accordance with one more embodiments.

DTX 560A can be a special state where the receiving device (e.g., UE group member 23) does not transmit any feedback because neither of the two control block stages 410C and 420C were received and respectively decoded by first control signal decoder 128A and second control signal decider 128B. This lack of response can occur, for example, because without either of the stages, the receiving device does not know where to direct a response. DTXs 560B-C can be respectively generated based on either second stage signal 420D being received and decoded or first stage signal 410E being received and decoded. The uses of these feedback DTXs 560A-C by the transmitting device is discussed below.

With respect to DTX 560A, because this signal indicates that receiving or encoding problems occurred with the transmission of both first stage signal 322 and second stage signal 324, this feedback can accurately indicate that a change in encoding scheme would be beneficial for a retransmission of control message 310, e.g., for both stages, changing to an encoding scheme less susceptible to interference.

In contrast to DTX 560A, DTXs 560B-C highlight several features of one or more embodiments described herein. With both 560B-C, because one of the two control stages are received, UE group leader 220 can receive a DTX 560B-C signal from UE group member 230, these DTXs 560B-C signals being distinguishable from absence of signal that results in a DTX 560A. However, based on the DTX 560B-C causes described above, upon receipt of a DTX signal as feedback, encoding selector 122 cannot determine which of first stage signal 322 or second stage signal 324 was not received and decoded by UE group member 230.

Thus, without an indication of which of first stage signal 322 or second stage signal 324 failed, encoding selector 122 has no indication of which of the encoding schemes could be adjusted to promote success. One approach that can be used is to modify both of the encoding schemes, based on a premise that the interference affects both similarly, e.g., switch both encoding schemes to a scheme that is less susceptible to interference. It should be noted that, in this example, signal interference is used as the reason signal stages are not successfully received and decoded, but this is intended to be non-limiting. Other factors can affect the success of these stages, including, but not limited to, processing and decoding capabilities of the UE.

An alternative approach used by one or more embodiments can be based on different concepts, including but not limited to a rejection of the premise that interference affects receipt and decoding of both first stage signal 322 and second stage signal 324 similarly. For example, as noted above, these signals can be transmitted using different frequency/time resources, have different lengths, and require different UR characteristics. Based on this, in some circumstances, UEs can have different decoding capabilities for each the stage signals. For example, a UE can have a combination of one or more features that enable the UE to receive and decode one stage signal over the other, including, but not limited to, a particular antenna configuration, device chipset, processing power for decoding, and other similar characteristics.

Based on the UE differences in receiving and decoding these stage signals, it is apparent that, in some circumstance the original approach to handling the ambiguous DTXs can risk slowing down one of the stages unnecessarily. For example, when the failure that caused the DTX was actually with the second stage, and the receiving UE is better at receiving the first stage, switching both stages to a slower encoding rate scheme unnecessarily slows down the first stage, e.g., it doesn't necessarily need link adaption.

Figure 6:
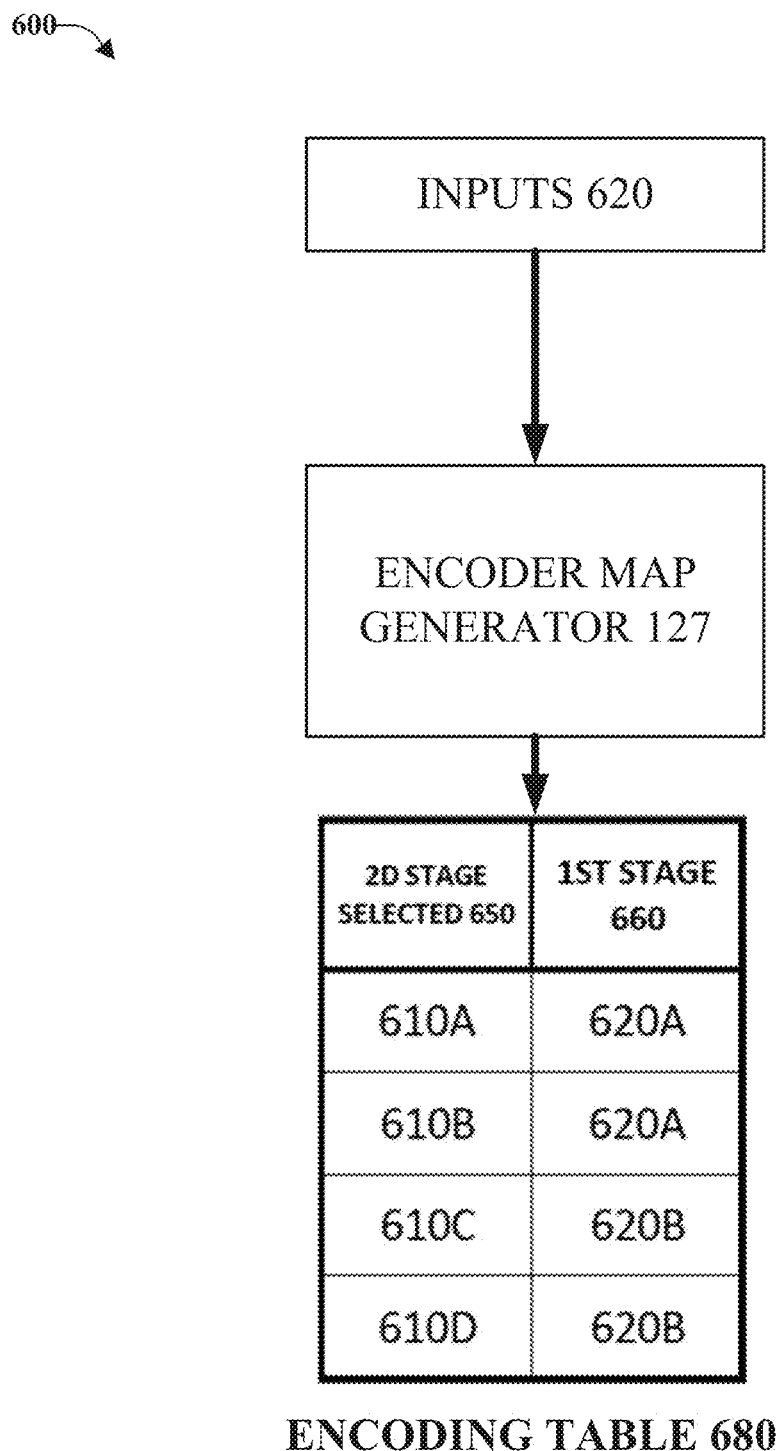
FIG. 6 depicts an example encoder map generator that can generate an encoder mapping table based on inputs, in accordance with one or more embodiments.

FIG. 6 depicts an example encoder map generator 125 that can generate encoding table 680 based on inputs 620, in accordance with one or more embodiments. For purposes of brevity, description of like elements and/or processes employed in other embodiments is omitted.

Figure 7:
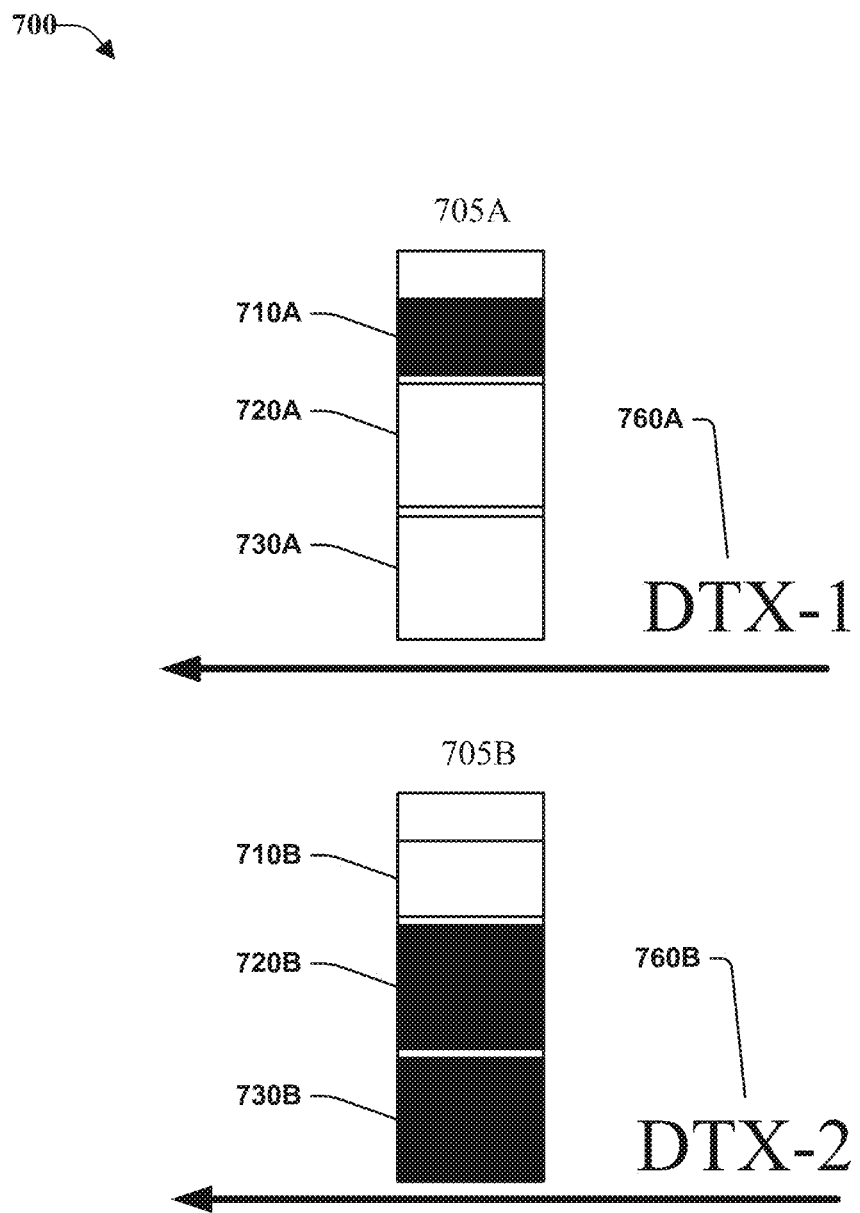
FIG. 7 illustrates an alternative embodiment, where the three state feedback system described above is expanded to a four state system, in accordance with one or more embodiments.

Summarizing aspects of the discussion of FIGS. 3-5 above: upon receipt of a DTX feedback signal from the transmission of a packet having a two-stage control message 310, the transmitting device (e.g., UE group leader 220) can advantageously change the encoding scheme of one or both of the control signal stages. Because the DTX signal is not specific as to which of the stages was unsuccessful (e.g., which stage may need encoding scheme adjustment), one approach is to adjust (e.g., slow down the encoding rate) of both stages, thereby potentially improving the unknown failing stage by sacrificing speed of the successful stage. FIGS. 6-7 and related discussion, describe different approaches that can be used by one or more embodiments to adjust the encoding rate of one of the two stages, thereby preventing, in some circumstances, the sacrificing of speed in the successful stage while improving the likelihood of successful decoding of the failing stage.

One approach that can be taken by one or more embodiment is to use channel monitoring by both the transmitting device (e.g., with channel monitor 126A) and reports from the receiving device (e.g., channel monitor 126B, if available), combined with other approaches that can be used to reduce interference, e.g., historical data, reports from other devices, etc. In some circumstances, this approach was used by encoding selector 122 to select the initial encoding scheme, and this approach could be used to estimate which stage had failed and what actions to take.

In an alternative embodiment, a mapping table can have been generated that is specific to the receiving device that provides a recommended encoding scheme for one of the stages, based on a selected scheme for the other stage. For reasons discussed below, in this example, the second stage is the stage for which analysis is applied for selection, and the first stage is selected based on the mapping table. Example reasons to select the second stage signal 324 of this example is because, in some circumstances link adaption for the second stage signal 324 SCI can be more coarse than link adaption for the first stage signal 322, e.g., the number of modulation coding scheme (MCS) levels are fewer for some approaches to second stage signal 324 encoding. Because of this and other reasons, the periodicity of adjusting the MCS for second stage signal 324 SCI can be larger than for first stage signal 322.

Thus, as depicted in FIG. 6, when encoding scheme 610A is selected 650 for second stage signal 324 encoding by the transmitting device (e.g., based on historical data, present conditions, etc.), encoding table 680 recommends that encoding scheme 620A be used for encoding first stage signal 322 (in this example, the encoding schemes range from (A) highest encoding rate and most susceptible to interference to (D) with the opposite characteristics). In one or more embodiments, analysis of encoding selection factors, as discussed above, can still be performed by the transmitting device, with stage 660 recommendation being one factor considered among many factors. In an alternative embodiment, response time and processing activity can be advantageously reduced by using the selected encoding scheme (e.g., 620A) with minimal or no analysis.

In additional embodiments, the usefulness of encoding table 680 for accurately selecting encoding schemes can be improved using different approaches. As noted above, one of the benefits of using encoding table 680 is that it can provide useful recommendations about differences in stage processing that are specific to the receiving device, e.g., because of the use of a particular chipset, the receiving device can handle first stage processing 340 better than second stage processing, and therefore reducing the encoding speed of both stages equally in response to a DTX may not be advantageous.

In one approach, to improve the likelihood that encoding table 680 matches the capabilities of the receiving device, encoding table 680 can be generated by the receiving device and communicated to the transmitting device in advance of an encoding scheme for a stage (e.g., first stage signal 322) being selected. This encoding table can improve both a retransmission based on a DTX signal, and the initial selection of an encoding scheme for first stage signal 322. In one or more embodiments, encoding table 680 can be generated by the receiving device and communicated via existing MAC CE or Radio Resource Control (RRC) feedback channels.

In one or more embodiments, encoding table 680 can be generated by the receiving device based on data that is more accessible to the receiving device than the transmitting device. Example inputs 620 that can be used by encoder map generator 122 include, but are not limited to, detailed decoding capabilities of the receiving device, records regarding the decoding success of different schemes for times ranging from the most recent period to long term historical data, channel conditions near the receiving device as measured by channel monitor 126B, FIG. 7 illustrates an alternative embodiment 700, where the three state feedback system described above is expanded to a four state system, in accordance with one or more embodiments. For purposes of brevity, description of like elements and/or processes employed in other embodiments is omitted.

In this approach, system overhead, both of the receiving device and the transmitting device can be expanded to include a dedicated feedback state for a failure to decode a particular element, e.g., second stage signal 324. Thus, as depicted in FIG. 7, DTX-1 760A and DTX-2 760B are included to provide feedback for additional circumstances. For example, for control message 705A, because first stage signal 710A was not decoded, a DTX-1 760A signal was provided as feedback, although it should be noted that this DTX-1 760A signal can correspond to the existing DTX 560B-C signal because, for example, of the handling of control message 705B described below.

For control message 705B, when second stage signal 720B is not decoded, instead of sending a generic DTX 560B-C signal, new signal DTX-2 760B can be provided, distinguishing over the generic DTX 560B-C signal to identify the second stage signal 720B as potentially requiring adjustment. With respect to this example, and other examples herein that describe one or more embodiments using link adaption approaches for two-stage (two-part) signals, it should be noted that one or more embodiments can be applied to link adaption for signals having more than two parts, with one having skill in the art, given the description herein, making adjustments to handle the additional stages.

Figure 8:
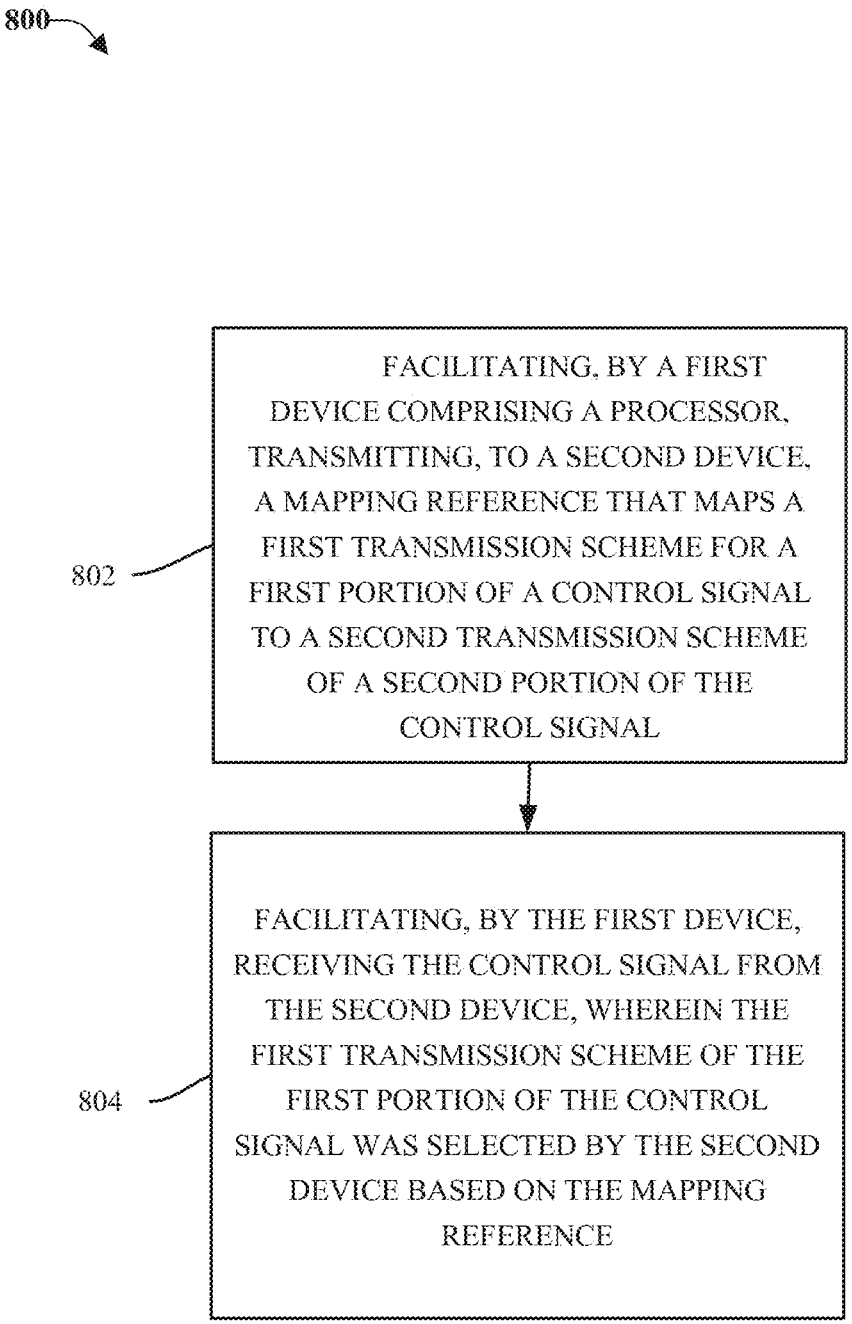
FIG. 8 illustrates a flow diagram of an example method that can facilitate link adaption for multistage messages, in accordance with one or more embodiments.

FIG. 8 illustrates a flow diagram of an example method 800 that can facilitate link adaption for multistage messages, in accordance with one or more embodiments. For purposes of brevity, description of like elements and/or processes employed in other embodiments is omitted.

At 802, method 800 can comprise facilitating, by a first device comprising a processor, transmitting, to a second device, a mapping reference that maps a first transmission scheme for a first portion of a control signal to a second transmission scheme of a second portion of the control signal. For example, in an embodiment a method 800 can comprise facilitating, by a first device 150B comprising a processor 160B, transmitting, to a second device 160A, a mapping reference (e.g., encoding table 680) that maps a first transmission scheme 410A for a first portion (e.g., first stage signal 322) of a control signal 310 to a second transmission scheme 420B of a second portion (e.g., second stage signal 324) of the control signal 310.

At 804, method 800 can comprise facilitating, by the first device, receiving the control signal from the second device, wherein the first transmission scheme of the first portion of the control signal was selected by the second device based on the mapping reference. For example, in an embodiment a method can comprise facilitating, by the first device, receiving the control signal from the second device, wherein the first transmission scheme of the first portion of the control signal was selected (e.g., by encoding selector 122) by the second device based on the mapping reference.

Figure 9:
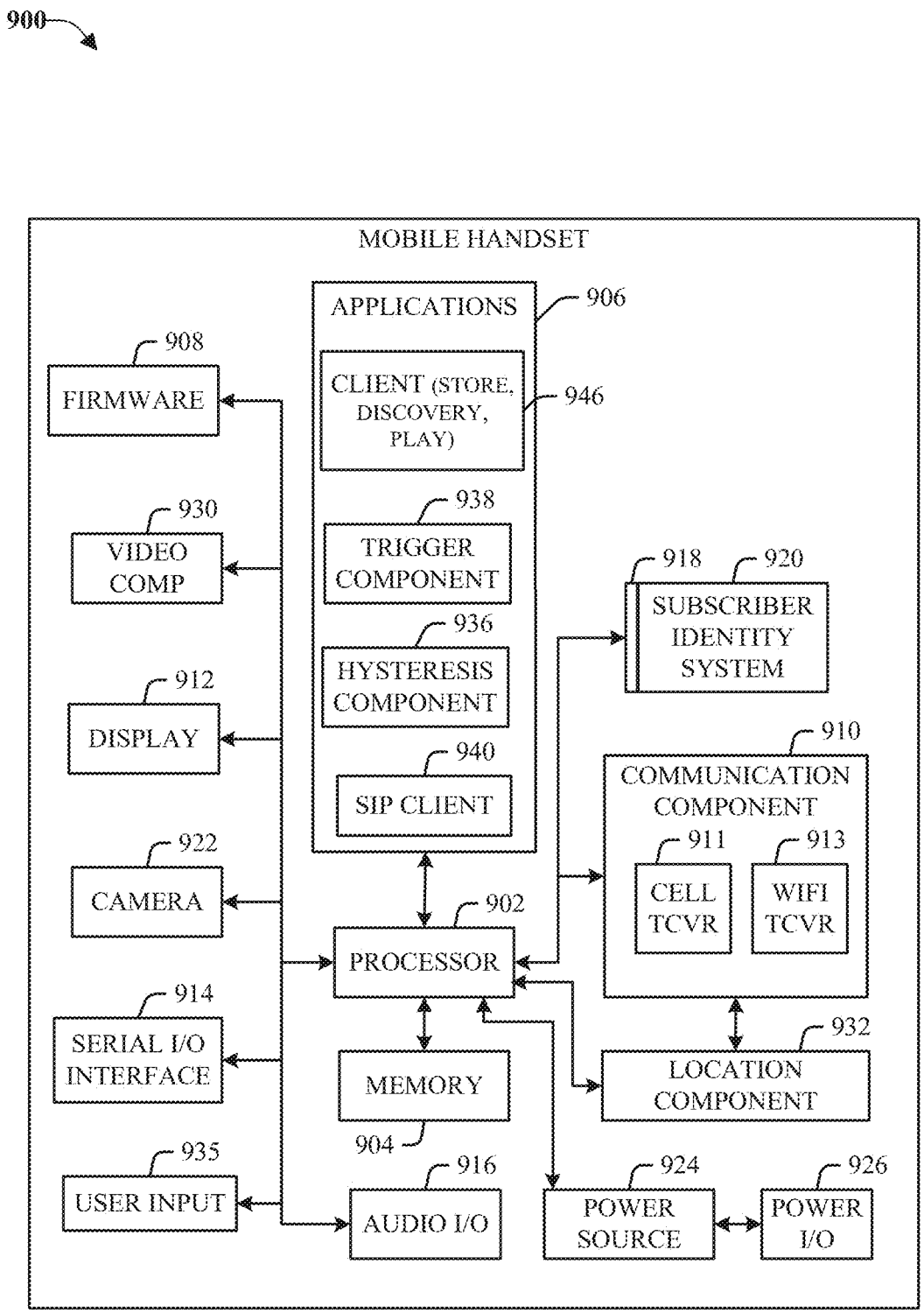
FIG. 9 illustrates an example block diagram of an example mobile handset operable to engage in a system architecture that can facilitate processes described herein, in accordance with one or more embodiments.

FIG. 9 illustrates an example block diagram of a mobile handset 900 operable to engage in a system architecture that facilitates wireless communications according to one or more embodiments described herein. For purposes of brevity, description of like elements and/or processes employed in other embodiments is omitted.

Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Device 150A-B can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

One or more embodiments can employ various cellular systems, technologies, and modulation schemes to facilitate wireless radio communications between devices (e.g., UEs 140A-B, and 310, and the network devices 150 and 350). While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, a wireless communication system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 140A-B and the network device 150) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
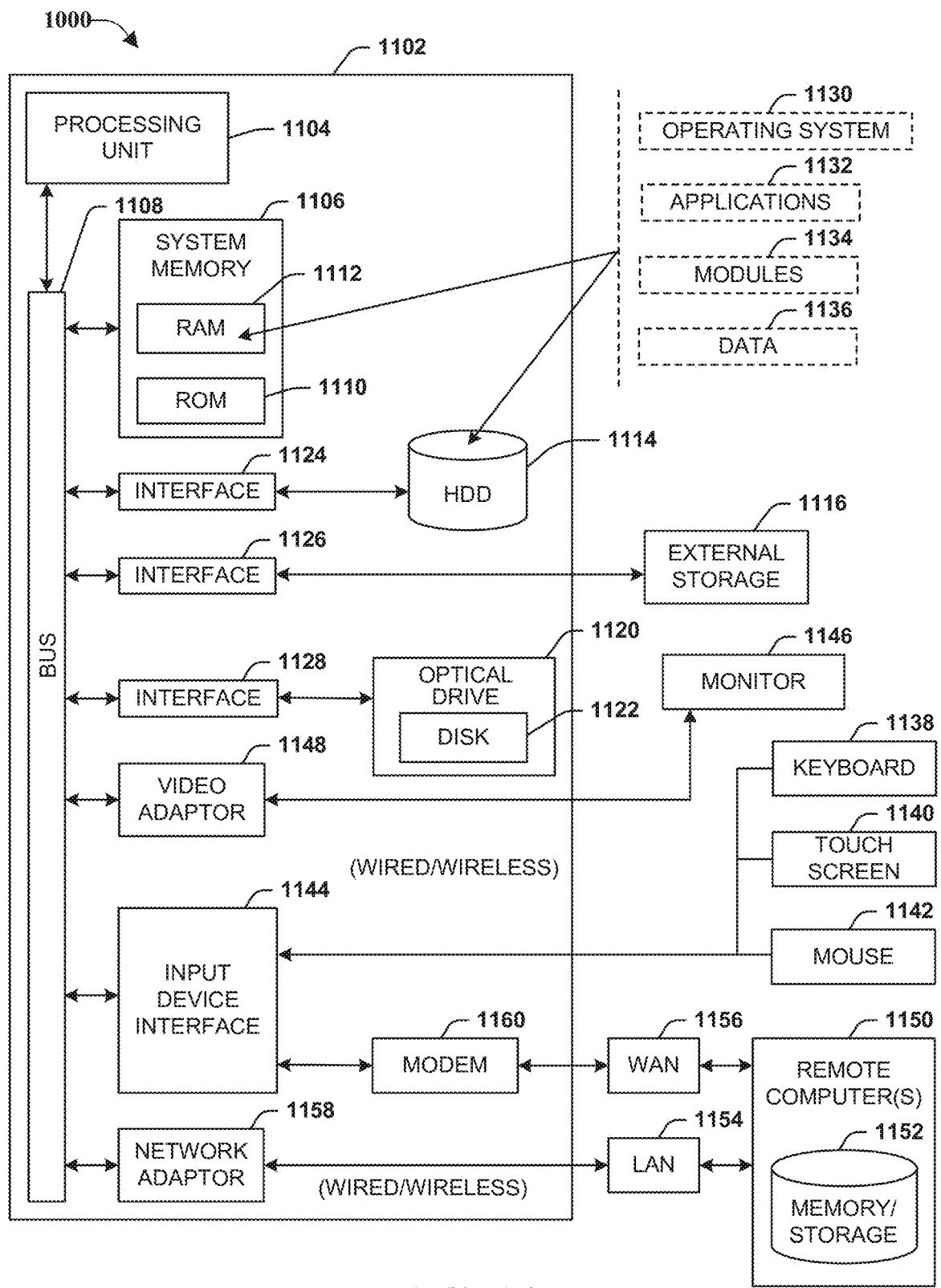
FIG. 10 illustrates an example block diagram of an example computer operable to engage in a system architecture that can facilitate processes described herein, in accordance with one or more embodiments.

Referring now to FIG. 10, in order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather is to be construed in breadth, spirit and scope in accordance with the appended claims.

What is claimed is:

1. First network equipment, comprising:
    a processor; and
    a memory that stores executable instructions that, when executed by the processor, facilitate performance of operations, comprising:
        determining that a control signal that was transmitted by the first network equipment was not received by second network equipment, wherein the control signal comprises a first portion employing a first transmission encoding scheme and a second portion employing a second transmission encoding scheme;
        based on the determining that the control signal was not received by the second network equipment, selecting a third transmission encoding scheme for the second portion of the control signal, wherein the third transmission encoding scheme was selected to enhance a retransmission of the control signal;
        based on a mapping of the third transmission encoding scheme to a fourth transmission encoding scheme in a mapping reference, selecting the fourth transmission encoding scheme for the first portion of the control signal; and
        transmitting the control signal comprising the first portion employing the fourth transmission encoding scheme and the second portion employing the third transmission encoding scheme.

2. The first network equipment of claim 1, wherein:
    the control signal comprises a sidelink channel control signal,
    the first portion comprises a first stage of the sidelink channel control signal, and
    the second portion comprises a second stage of the sidelink channel control signal.

3. The first network equipment of claim 1, wherein selecting the fourth transmission encoding scheme comprises selecting the fourth transmission encoding scheme further based on monitored channel conditions.

4. The first network equipment of claim 1, wherein selecting the fourth transmission encoding scheme comprises selecting the fourth transmission encoding scheme further based on an indication received from the second network equipment regarding previous control messages received by the second network equipment.

5. The first network equipment of claim 1, wherein the transmission encoding scheme comprises a modulation coding scheme.

6. The first network equipment of claim 1, wherein the operations further comprise receiving the mapping reference from the second network equipment.

7. The first network equipment of claim 6, wherein the second network equipment generated the mapping reference based on a capability of the second network equipment.

8. The first network equipment of claim 6, wherein the second network equipment generated the mapping reference based on results of decoding control signals that were previously received by the second network equipment.

9. A method, comprising:
    facilitating, by first network equipment comprising a processor, transmitting, to second network equipment, a mapping reference that maps a first transmission encoding scheme for a first portion of a control signal to a second transmission encoding scheme of a second portion of the control signal; and
    facilitating, by the first network equipment, receiving the control signal from the second network equipment, wherein the first transmission encoding scheme of the first portion of the control signal was selected by the second network equipment based on the mapping reference, and wherein the second transmission encoding scheme of the second portion of the control signal was selected to enhance transmission of the second portion.

10. The method of claim 9, wherein the first transmission encoding scheme of the first portion of the control signal was selected by the second network equipment based on a mapping, from the mapping reference, of the second transmission encoding scheme of the second portion of the control signal to the first transmission encoding scheme.

11. The method of claim 9, wherein the second transmission encoding scheme of the second portion of the control signal was selected by the second network equipment based on monitored channel conditions.

12. The method of claim 9, further comprising facilitating, by the first network equipment, transmitting, to the second network equipment, an indication regarding previous control messages received by the first network equipment, wherein the second transmission encoding scheme of the second portion of the control signal was selected by the second network equipment based on the indication.

13. The method of claim 9, further comprising generating, by the first network equipment, the mapping reference based on capabilities of the second network equipment.

14. The method of claim 13, wherein the capabilities of the second network equipment comprise the capabilities of a chipset of the second network equipment.

15. The method of claim 13, wherein the capabilities of the second network equipment comprise the capabilities of an antenna of the first network equipment.

16. The method of claim 9, further comprising generating, by the first network equipment, the mapping reference based on information regarding channel conditions.

17. A non-transitory machine-readable medium, comprising executable instructions that, when executed by a processor of first network equipment, facilitate performance of operations, comprising:
    receiving, from second network equipment, a first control message comprising a first portion and a second portion;
    decoding one of the first portion or the second portion of the first control message, resulting in a decoded portion of the first control message and an undecoded portion of the first control message;
    transmitting a feedback signal to the second network equipment comprising information corresponding to:

a type of the decoded portion of the first control message, and an unsuccessful attempt to decode the undecoded portion of the first control message; and receiving, from the second network equipment, a second control signal, wherein the second portion of the second control signal was encoded based on the undecoded portion of the first control message.

18. The non-transitory machine-readable medium of claim 17, wherein the feedback signal further comprises a discontinuous transmission encoding signal applicable to a fifth generation radio access network.

19. The non-transitory machine-readable medium of claim 17, wherein the second control signal was generated based on the feedback signal.

20. The non-transitory machine-readable medium of claim 19, wherein the second control signal employs a different encoding scheme than was employed to encode the first control message.

* * * * *